United States Patent [19]

Izaki et al.

[11] Patent Number: 4,800,182

[45] Date of Patent: Jan. 24, 1989

[54] SILICON NITRIDE-SILICON CARBIDE COMPOSITE MATERIAL AND PROCESS FOR PRODUCTION THEREOF

[75] Inventors: Kansei Izaki; Takamasa Kawakami; Kouichi Hakkei; Kazuhiro Ando, all of Niigata, Japan

[73] Assignee: Mitsubishi Gas Chemical Company, Inc., Japan

[21] Appl. No.: 4,476

[22] Filed: Jan. 20, 1987

[51] Int. Cl.⁴ .................. C04B 35/56; C04B 35/58
[52] U.S. Cl. ...................................... 501/92; 501/95; 501/97; 264/65
[58] Field of Search ............... 501/92, 95, 96, 97; 264/65, DIG. 19

[56] References Cited

U.S. PATENT DOCUMENTS

| | | | |
|---|---|---|---|
| 3,890,250 | 6/1975 | Richerson | 501/97 |
| 4,184,882 | 1/1980 | Lange | 501/92 |
| 4,187,116 | 2/1980 | Lange | 501/92 |
| 4,594,330 | 6/1986 | Suzuki et al. | 501/92 |
| 4,594,330 | 6/1986 | Suzuki et al. | 501/92 |
| 4,613,490 | 9/1986 | Suzuki et al. | 423/344 |

FOREIGN PATENT DOCUMENTS 1184573  3/1985  Canada ................... 501/92

58-91090  5/1983  Japan .
61-201663  9/1986  Japan .

Primary Examiner—William R. Dixon, Jr.
Assistant Examiner—Anthony J. Green
Attorney, Agent, or Firm—Leydig, Voit & Mayer

[57] ABSTRACT

The invention relates to a sintered silicon nitride-silicon carbide composite material excellent in toughness and strength and to a process for producing the same. The present sintered composite material is substantially formed of silicon nitride predominantly in $\beta$-phase and about 5 to 35% by weight of silicon carbide predominantly in $\beta$-phase, which is characterized by the microstructure such that the silicon nitride is in the form of fine grains comprising elongated grains, 0.2 to 1.0 $\mu$m in length of minor axis and 1 to 10 $\mu$m in length of major axis, and equiaxed grains, 1 $\mu$m or below in average size, and the silicon carbide is in the form of equiaxed grains, 1 $\mu$m or below in average size, said silicon carbide grains being uniformly dispersed. Having a three-point flexural strength of at least 95 kg/mm² and a fracture toughness ($K_{IC}$) of at least 54 MN/m^{3/2}, the present sintered material is excellent in toughness and strength. The process for producing such a material is disclosed in detail.

6 Claims, 3 Drawing Sheets

SILICON NITRIDE-SILICON CARBIDE COMPOSITE MATERIAL AND PROCESS FOR PRODUCTION THEREOF

BACKGROUND OF THE INVENTION

1. Field of the Invention

This invention relates to a sintered silicon nitride-silicon carbide composite material and a process for producing the same and, more particularly, to a sintered composite material excellent in toughness and strength, which is substantially formed of silicon nitride predominantly in $\beta$-phase and about 5 to 35% by weight of silicon carbide predominantly in $\beta$-phase and which has a microstructure in which the silicon carbide grains of 1 $\mu$m or less in average size are uniformly dispersed. This invention further relates to a process for producing an amorphous composite powder suitable for the fabrication of said sintered material.

2. Description of the Prior Art

Silicon nitride has recently attracted increasing attention as an engineering ceramic for use in structural materials which are exposed to high temperature. Especially, silicon nitride is excellent in both heat shock resistance and fracture toughness, while silicon carbide is distinguished in both oxidation resistance and strength at high temperature. For these reasons, both silicon nitride and silicon carbide are now under development in fields where the advantages of each material might be fully manifested. For instance, in Japanese patent application "Kokai" (Laid-open) No. 201,663/86, it is attempted to improve the strength and toughness of a sintered silicon nitride by producing in the sintered product a fibrous material of large aspect ratio (length-to-breadth ratio) by controlling the sintering process. On the other hand, various attempts have been made to develop a sintered silicon nitride-silicon carbide composite material to take advantage of characteristics of both material.

As the methods for producing silicon nitride-silicon carbide composite materials, there may be mentioned the following ones.

(1) A method of pressure sintering, wherein a mechanical mixture of silicon nitride ($Si_3N_4$) powder and silicon carbide (SiC) powder is sintered, for example, by means of a hot-pressing.

(2) A method of reaction sintering, wherein a molded body comprising silicon carbide (SiC) powder and silicon (Si) powder is subjected to nitriding reaction to form therein a silicon nitride-silicon carbide composite material or a molded product comprising silicon nitride ($Si_3N_4$) powder and carbon is subjected to silicon (Si) permeation to form therein a silicon nitride-silicon carbide material.

(3) A method, wherein a mixture of organo-silicon polymer and silicon (Si) powder is molded directly or after heat treatment and the molded body is subjected to a nitriding reaction to form a silicon nitride-silicon carbide composite material.

Of these methods, the methods (2) and (3) produce the materials generally having advantages of good dimensional precision and excellent moldability but difficulties are encountered in producing a high density products which are excellent in toughness and strength because of the tendency of the resulting sintered products to be porous.

For the above reasons, in order to obtain high density products, it is general practice to adopt method (1). For instance, in U.S. Pat. No. 4,184,882 or J. Am. Ceram. Soc., 56, 445 (1973), it is disclosed that $Si_3N_4$-SiC composite materials, improved in thermal conductivity and high-temperature strength, as compared with that obtained from silicon nitride ($Si_3N_4$), can be obtained by adding silicon carbide (SiC) powder of less than about 5 $\mu$m in particle size to silicon nitride ($Si_3N_4$) powder. It is also shown, however, that the product has no tendency to improve in room-temperature strength as compared with the case of silicon nitride ($Si_3N_4$), the tendency depending to a large extent on the particle size of the silicon carbide (SiC) which was added.

It is also disclosed in U.S. Pat. No. 3,890,250 that a silicon nitride-silicon carbide composite material high in both strength even at room temperature and electric conductivity can be obtained by using a silicon carbide powder of 3 to 5 $\mu$m in particle size. In this U.S. Patent, however, no mention is made of the fracture toughness whichis one of the important physical properties. As will be shown later in a comparative example, a sintered silicon nitride-silicon carbide composite material having a fracture toughness and a room-temperature strength as high as those of the sintered composite material of the present invention can never be obtained by sintering a mere mechanical mixture of a fine silicon nitride ($Si_3N_4$) powder and a fine silicon carbide (SiC) powder.

Further, in Japanese Patent Application "Kokai" (Laid-open) No. 58-91070, there is disclosed a sintered composite material excellent in high-temperature strength and heat shock resistance, which is formed from a silicon nitride ($Si_3N_4$)-silicon carbide (SiC) mixed powder obtained by vapor phase reaction. This mixed powder, however, contains a halogen such as chlorine and, accordingly, it is impossible to obtain from such a mixed powder a high-performance composite material.

As described above, in spite of some partial improvement in physical properties, the conventional composite materials are unable to produce those sintered composite materials higher in strength and toughness which are the object of the present invention.

Under the above circumstances, the present inventors previously found an amorphous composite powder composed of silicon, carbon, nitrogen and hydrogen in a composition represented by $SiC_xN_yH_z$, wherein $0<x<4$, $0<y<3$, and $0<z<4$, which contains substantially no halogen and oxygen [Japanese patent application "Kokai" (Laid-open) No. 221,311/85]. When synthesized under proper conditions, this amorphous powder is a fine powder of submicron order in particle size. When prepared under most favorable conditions, it is a spherical fine powder of 0.2 to 0.05 $\mu$m in particle size and has a narrow particle size distribution. Under the temperature conditions of the synthesis, the powder is thermally stable and change in composition is also very small. It was found, however, that this powder as such had a disadvantage of requiring a high temperature of 1,600° C. or above for sintering and, accordingly, it tends to liberate gases during sintering, thereby leaving behind a porous product in place of a high density product, having a high strength, and a high toughness. In addition, it was found that it had another disadvantage of tending to react chemically with water ($H_2O$) or oxygen ($O_2$).

SUMMARY OF THE INVENTION

The present inventors conducted an extensive study on a sintered silicon nitride ($Si_3N_4$)-silicon carbide (SiC) composite material which has a high-density, and is excellent in both strength and fracture toughness and on the subject of finding a method for producing such a composite material. As a result, they found a high density sintered silicon nitride-silicon carbide composite material which is high in both strength and toughness in compliance with the requirements and established a process for producing such as composite material.

The present invention relates to a sintered silicon nitride-silicon carbide composite material which is substantially formed of silicon nitride predominantly in β-phase and about 5 to 35% by weight of silicon carbide predominantly in β-phase and which is characterized by having a microstructure in which the silicon nitride is in the form of fine grains comprising elongated grains, 0.2 to 1.0 μm in length of minor axis and 1 to 10 μm in length of major axis, and equiaxed grains, 1 μm or below in average size, and the silicon carbide is in the form of equiaxed grains, 1 μm or below in average size, the silicon carbide particles being uniformly dispersed. The present invention relates also to a process for producing the above sintered composite material.

Such a sintered silicon nitride-silicon carbide composite material has a flexural strength of at least 95 kg/mm$^2$, as measured by the three-point bending test, and a fracture toughness ($K_{IC}$) of at least 5.4 MN/m$^{3/2}$, indicating the superiority in both the flexural strength and the fracture toughness. Such a silicon nitride-silicon carbide composite material is formed not from a conventional mechanical mixture of a silicon nitride powder and a silicon carbide powder but from an amorphous composite powder of the composition represented by the general formula $SiC_aN_bH_c$, wherein $0.1<a<2.0$, $0.1<b<1.5$ and $0<c<4.0$, by heat treating said amorphous composite powder at a temperature of 1,000° to 1,300° C. under an atmosphere of one non-oxidizing gas selected from nitrogen, argon, helium, and hydrogen or, alternatively, at a temperature of 1,300° to 1,400° C. under a stream, of a linear velocity of at least 0.05 cm/sec, of one non-oxidizing gas selected from nitrogen, argon and helium to obtain an amorphous spherical composite powder having a composition represented by the general formula $SiC_xN_yO_z$, wherein $0<x<1.5$, $0<y<2.0$ and $0<z<0.2$, and an average particle size of 1 μm or below, and then sintering the resulting amorphous composite powder together with 1 to 15% by weight of a sintering aid under an atmosphere of a non-oxidizing gas under application of pressure to yield the sintered silicon nitride-silicon carbide composite material of this invention. A preferred amorphous spherical composite powder of the composition represented by the general formula $SiC_xN_yO_z$ has a carbon content of 1.5 to 10.5% by weight and an oxygen content of 5% by weight and an average particle size of 1 μm or less.

BRIEF DESCRIPTION OF THE DRAWINGS

FIG. 1 is a scanning electron micrograph (SEM) of the fracture surface of a test piece containing 10% SiC used in the three-point bending test;

FIG. 2 is an optical micrograph (×1,000) which shows the distribution of $Si_3N_4$ and SiC grains in the sintered composite material of this invention.

DESCRIPTION OF THE PREFERRED EMBODIMENTS

Figure 1:
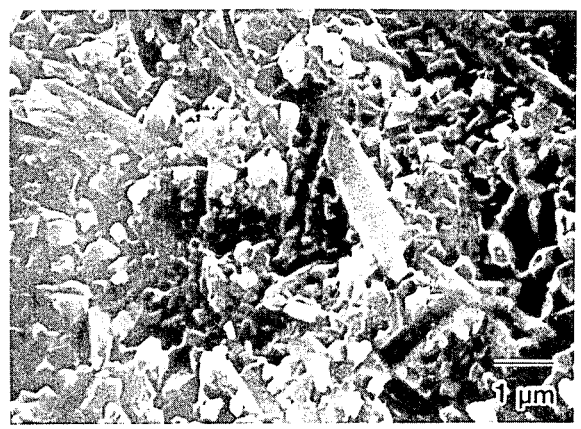
FIGS. 1 and 2 each represent a microstructure of the sintered composite material of this invention.

The amorphous composite powder of this invention represented by the general formula $SiC_aN_bH_c$, wherein $0.1<a<2.0$, $0.1<b<1.5$ and $0<c<4.0$, can be prepared by the synthetic methods such as, for example, the method of vaper phase reaction (prior U.S. Pat. No. 4,594,330 of the present inventors and collaborators). For instance, it is formed from an organosilicon compound containing substantially non halogen by the vaper phase reaction. As examples of the organosilicon compounds containing substantially no halogen, mention may be made of the following compounds:

(1) Silazane compounds represented by the general formula $[R_1R_2R_3Si]_2NR_4$ or $\{R_1R_2Si-NR_3\}_n$ wherein $R_1$, $R_2$, $R_3$ and $R_4$ each represent hydrogen alkyl, allyl or phenyl and n is 3 or 4. Examples of individual compounds are $[HSi(CH_3)_2]_2NH$, $[(CH_3)_3Si]_2NH$, $[(CH_3)_2Si]_2NCH_3$, $[(CH_2=CH)Si-(CH_3)_2]_2NH$, $\{(CH_3)_2Si-NH\}_3$, and $\{(CH_3)_2Si-NH\}_3$. There is also tris(N-methylamino)tri-N-methylcyclotrisilazane of the chemical formula

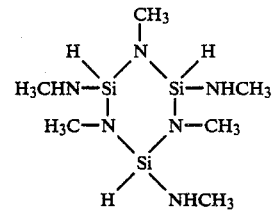

which is a 6-membered cyclic compound an N-methylamino group as the substituent on each silicon atom.

(2) organosilicon compounds represented by the general formula $R_nSi(NR_1R_2)_m$, wherein R, $R_1$ and $R_2$ each represents hydrogen, alkyl, allyl or phenyl, except for the case where R, $R_1$ and $R_2$ are simultaneously hydrogen, n is 0 to 3 and m is 4-n. Examples of individual compounds are aminosilicon compounds such as $CH_3Si(NHCH_3)_3$, $(CH_3)_2Si(NHCH_3)_2$, and $(CH_3)_2Si[N(CH_3)_2]_2$.

(3) Organosilicon compounds represented by the general formula $R_nSi(CN)_m$, wherein R represents hydrogen, alkyl, allyl or phenyl, n is 0 to 3, and m is 4-n. Examples of individual compounds are cyanosilicon compounds such as $H_3SiCN$, $(CH_3)_3SiCN$, $(CH_3)_2Si(CN)_2$, $(CH_2=CH)CH_3Si(CN)_2$, $(C_6H_5)_3Si(CN)$, and $(C_6H_5)_3Si(CN)_2$.

(4) Organosilicon compounds represented by the general formula $R_{2n+2}Si_n$, wherein R represents hydrogen, alkyl, allyl or phenyl, except for the case where R's represent simultaneously hydrogen, and n is an integer of 1 to 4, and (5) Organosilicon compounds having SiH linkage and represented by the general formula $R_3Si\text{-}(R'\text{---}R_2Si\text{-})_mR_1$, wherein $R_1$, $R_2$ and $R_3$ each represents hydrogen, alkyl, allyl or phenyl, $R'$ represents methylene, ethylene, or phenylene, and m is an integer of 1 or 2, and organosilicon compounds of the above general formula but containing no SiH linkage. Examples of the individual compounds are $(CH_3)_4Si$, $(C_2H_5)_2SiH_2$,

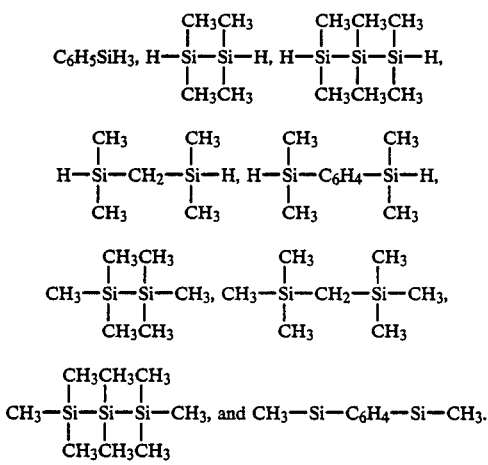

To prepare an amorphous composite powder from the organosilicon compounds listed above by the vapor phase reaction, one of the above organosilicon compounds is subjected to vapor phase reaction under an inert gas atmosphere at 600° to 1,600° C., preferably 800° to 1,400° C., most preferably 900° to 1,200° C. When the reaction temperature is below 600° C., the reaction will not proceed sufficiently, whereas if the temperature exceeds 1,600° C., the deposition of metallic silicon or carbon becomes predominant. The type of inert gas atmosphere is important for the composition of the resulting composite powder. When the atomic proportion of Si, C and N of the initial organosilicon compound used as starting material is similar to that of the intended amorphous powder, it is desirable to use an inert gas such as nitrogen, argon or helium. When the atomic proportion of Si, C and N of the initial organosilicon compound is much different from that of the intended amorphous powder, it is desirable to add gaseous ammonia or hydrogen to the inert atmosphere, depending upon the composition of the initial organosilicon compound.

The fine amorphous composite powder prepared by the known vapor phase reaction described above has a compositon represented by the general formula $Si\text{-}C_aN_bH_c$, wherein $0.1 < a < 2.0$, $0.1 < b < 1.5$ and $0 < c < 4.0$. The particle size is on the order of submicrons, that is, 0.2 to 0.05 μm in size. The particle size distribution is very narrow. When used as such powders, the resulting sintered material tends to be porous and it is difficult to obtain a high density sintered material having high strength and high toughness. The present inventors, therefore, conducted an extensive study on the high density sintered silicon nitride-silicon carbide composite material having high strength and high toughness and, as a result, found that such an intended high density sintered composite material can be obtained by first heat-treating under specific conditions the fine amorphous composite powder obtained by the vapor phase reaction, thereby to remove the volatile matters, and then sintering the resulting material. This invention has been accomplished on the basis of the above finding. It is important to perform the above heat treatment under a non-oxidizing atmosphere or in vacuum and at a temperature in the range of from 1,000° to 1,400° C. in which no crystallization takes place. The above composite powder exhibits the following change when heated at a high temperature.

In the first stage, the powder liberates volatilized matters and the active linkage Si-H or N-H disappears. During this period, $CH_4$, $H_2$, $N_2$, HCN and hydrocarbons are released, resulting in a weight loss of 10 to 20%. The powder particles in this stage are spherical in shape and amorphous. In the second stage, crystallization begins to take place and the X-ray diffraction pattern shows crystalline structure. The powder in this stage changes in shape from sphere to an equiaxed particle or the particle size increases.

In order to obtain an intended composite powder, the heat treatment should be performed under the conditions adjusted to those of the first stage. More particularly, when the heat treatment is performed at a comparatively low temperature in the range of 1,000° to 1,300° C. below, the atmosphere can be a non-oxidizing gas such as argon, helium, nitrogen or hydrogen. The time of heat treatment is selected depending upon the temperature conditions and the quantity of material being heat treated. For instance, when about 200 g of the material is treated, the heat treatment can be completed in 8 hours at 1,000° C. or in about 6 hours at 1,250° C. When the heat treatment is performed at a comparatively high temperature in the range of from 1,300° to 1,400° C., an advantage of a comparatively short time of heat treatment is gained, but under certain conditions crystallization tends to occur, and the particles grow or retain the spherical shape with difficulty. For instance, when hydrogen is used as an inert atmosphere, crystallization of particles occur and the particle size increase unfavorably. When the heat treatment is performed at a comparatively high temperature exceeding 1,300° C., it is preferable to use non-oxidizing atmosphere such as argon, nitrogen or helium. As described above, under such conditions of heat treatment, gases such as methane, hydrogen, nitrogen, hydrogen cyanide or hydrocarbons are liberated, and those gases also accelerate the crystallization of the particle. It is, therefore, necessary under such temperature conditions to remove such gases from the reaction zone even when argon, nitrogen or helium is used as the inert atmosphere. Accordingly, when heat treatment is performed at a temperature in the range of from 1,300° to 1,400° C., it is desirable to perform the heat treatment under a gas stream of a linear velocity of at least 0.05 cm/sec, usually at 0.05 to 100 cm/sec. A linear velocity of the inert gas stream exceeding 100 cm/sec is undesirable because of increased gas consumption and scattering of the powder under treatment.

In performing the heat treatment, it is desirable to remove moisture and oxygen from the inert atmosphere, since contamination of the atmosphere with excessive moisture or oxygen is unfavorable to the sintering.

When the heat treatment is carried out under the controlled conditions as described above, the splitting of hydrogen and the combination with oxygen take place and there is formed an amorphous spherical composite powder of 1 μm or below in average size having a composition represented by the general formula $SiC_xN_yO_z$, wherein $0<x<1.5$, $0<y<2.0$ and $0<z<0.2$.

The resulting amorphous spherical composite powder is mixed with a sintering aid and sintered at atmospheric pressure or under application of pressure by the method of hot-pressing, gas pressure sintering, or HIP to yield a sintered silicon nitride-silicon carbide composite material. For example, in a typical hot press method, the conditions are as follows: 1.750°–1,850° C., 200–400 kg/cm$^2$, and 0.5–3 hours.

With respect to sintering aids, any substance is suitable which forms a liquid phase at the sintering temperature and accelerates to make elongated grains of silicon nitride. Of such substances, especially effective are MgO, $Al_2O_3$, $Y_2O_3$, $CeO_2$ and $La_2O_3$. These substances are used each alone or in mixtures. The amount used of a sintering aid is generally in the range of from 1 to 15% by weight.

The high strength of the present sintered composite material seems to originate from its microstructure which comprises silicon nitride in the form of elongated grains of fine particles, 0.2 to 1.0 μm in the length of the minor axis and 1 to 10 μm in the length of the major axis, and in the form of fine equiaxed grains, 1 μm or less in average size, and silicon carbide in the form of equiaxed grains, 1 μm or less in average size, the silicon carbide particles being dispersed uniformly.

The fracture toughness of the present sintered composite material is also higher than that of the sintered silicon nitride and shows a maximum value when the silicon carbide content is about 10%; the fracture toughness tends to decline with the increase of silicon carbide content beyond 10%, owing probably to the decrease of the number of silicon nitride grains. The higher fracture toughness of the present sintered composite material than that of silicon nitride seems to be due to the structure of silicon nitride, the elongated grains keeping the crack from propagation. The hardness of the present sintered material tends to increase with the increase in silicon carbide content.

The microstructure of the present sintered composite material is illustrated below with reference to accompanying SEM and optical micrograph.

As is apparent from FIG. 1, the present sintered material comprises fine elongated grains and fine equiaxed grains, most of the former grains being 0.2 to 1.0 μm in minor axis and 1 to 10 μm in major axis. Since the elongated grains decrease in number with the increase in silicon carbide content, the elongated grains may be assumed to be silicon nitride grains. The equiaxed grains are 1 μm or less in average size and may be assumed to be silicon carbide grains and silicon nitride grains.

Figure 2:
Figure 3:
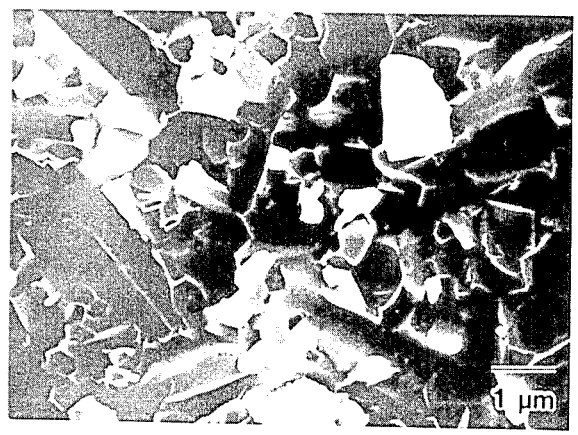
FIG. 3 is SEM of the fracture surface of a three-point bending test piece of the sintered silicon nitride ($Si_3N_4$) powder of Comparative Example 1.

In FIG. 2, the gray grains are those of silicon nitride and the white grains are those of silicon carbide. It is seen from FIG. 2 that silicon carbide grains are 1 μm or less in size and uniformly dispersed.

Figure 4:
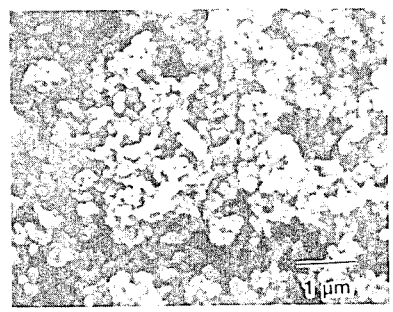
FIG. 4 is SEM of an amorphous spherical powder suitable for producing the sintered material of this invention.

FIG. 4 shows SEM of a composite powder obtained by the heat treatment at 1200° C., for 4 hours, under nitrogen atmosphere, of an amorphous composite powder formed by the vapor phase reaction of $CH_3Si(NHCH_3)_3$. It is seen that the composite powder is a spherical powder of 0.1 to 0.3 μm in particle size and its size distribution is very narrow.

Figure 5:
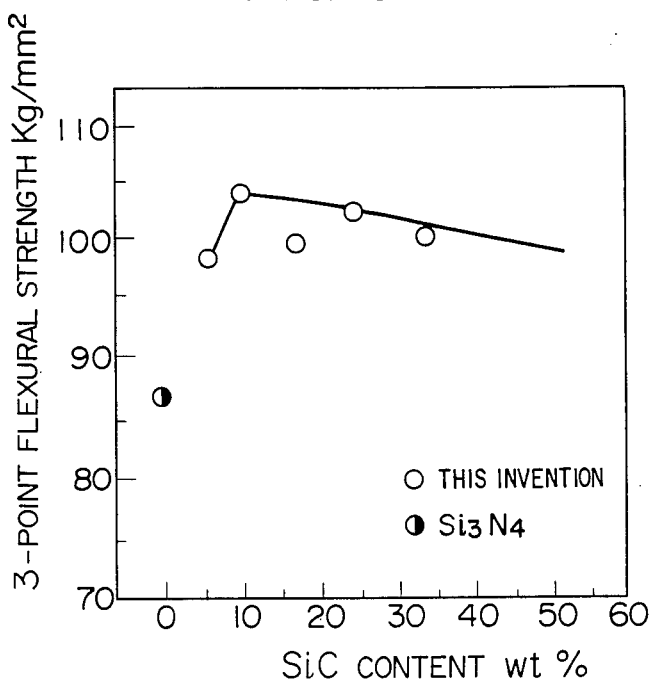
FIG. 5 shows the three-point flexural strength of the sintered material of this invention.

FIG. 5 shows that the three-point flexural strength is 95 kg/mm$^2$ or above in the range of silicon carbide content of 3 to 35% by weight. These values are higher than those of sintered silicon nitride.

The invention is illustrated below in detail with reference to Examples and Comparative Examples which are presented as mere examples and not to be construed as limiting the invention. In the examples, the 3-point flexural strength was tested at a span of 20 mm and a cross-head speed of 0.5 mm/minute. The fracture toughness was tested by the method of indentation microfracture and evaluated by using the formula described in J. Mater. Sci. Lett., 1, 13 (1982). The bulk density was tested by Archimedes method and the hardness was evaluated in terms of Vickers hardness number by using a microhardness tester (19.6 N load; 20-second retention).

EXAMPLE 1

The vapor of $CH_3Si(NHCH_3)_3$ formed by the complete vaporization in a preheater was thoroughly mixed with argon and gaseous ammonia to form a gas mixture in which $CH_3Si(NHCH_3)_3$:Ar:$NH_3$ = 7.5:67.5:25. The gaseous mixture, used as the starting material, was fed to an alumina reactor, 50 mm in internal diameter and 80 mm in length, which had been held at 1,000° C. to carry out the reaction and to obtain the reaction product. The composition of the resulting amorphous composite powder was as shown in Table 1.

A 50-g portion of the amorphous composite powder was heat-treated at 1,200° C. for 4 hours under a nitrogen atmosphere. The heat treatment caused a loss of 13.8% by weight. The resulting powder was amorphous, because the X-ray diffraction pattern showed no peak. Inspection of SEM showed that the powder was spherical, the particle size being distributed in a narrow range of from 0.1 to 0.3 μm. The SEM was as shown in FIG. 4 and the composition of the composite powder was as shown in Table 1.

EXAMPLES 2 TO 8

Using a reactor similar to that in Example 1, the vapor phase reaction was conducted with various starting materials and reaction conditions. The resulting powder was heat treated. The type of starting material, reaction conditions and the composition of resulting powder were as shown in Table 1.

TABLE 1

| Example No. | Organosilicon compound | Conditions of vapor phase reaction | | | | | Composition of resulting powder $SiC_aN_bH_c$ | | | Conditions of heat treatment | | | Composition of resulting powder $SiC_xN_yO_z$ | | |
|---|---|---|---|---|---|---|---|---|---|---|---|---|---|---|---|
| | | Temperature (°C.) | concentration (Vol %) | Ar | NH$_3$ (wt %) | H$_2$ | a | b | c | Temperature (°C.) | Time (hr) | Atmosphere | x | y | z |
| 1 | $CH_3Si(NHCH_3)_3$ | 1000 | 7.5 | 67.5 | 25.0 | — | 0.37 | 0.86 | 0.27 | 1200 | 4 | N$_2$ | 0.45 | 0.69 | 0.04 |
| 2 | $[(CH_3)_2SiN(CH_3)_2]_2$ | 1100 | 8.0 | 72.0 | 12.5 | 7.5 | 0.64 | 0.59 | 0.58 | 1200 | 4 | N$_2$ | 0.54 | 0.58 | 0.03 |
| 3 | $[(CH_3)_3Si]_2NH$ | 1200 | 10.3 | 74.2 | 15.0 | — | 0.87 | 0.21 | 0.29 | 1200 | 4 | N$_2$ | 0.92 | 0.11 | 0.03 |
| 4 | $(CH_3)_3SiCN$ | 1000 | 7.8 | 67.2 | 5.2 | 20.0 | 0.46 | 0.66 | 0.52 | 1000 | 6 | Ar | 0.51 | 0.61 | 0.03 |
| 5 | $(CH_3)_2Si(CN)_2$ | 1200 | 5.0 | 70.0 | 25.0 | — | 0.33 | 1.07 | 0.42 | 1000 | 6 | Ar | 0.35 | 0.97 | 0.03 |
| 6 | $(CH_3)_4Si$ | 1200 | 10.1 | 53.2 | 28.3 | 8.4 | 0.62 | 0.60 | 0.67 | 1200 | 4 | N$_2$ | 0.72 | 0.36 | 0.02 |

TABLE 1-continued

| Example No. | Organosilicon compound | Conditions of vapor phase reaction | | | | | Composition of resulting powder $SiC_aN_bH_c$ | | | Conditions of heat treatment | | | Composition of resulting powder $SiC_xN_yO_z$ | | |
|---|---|---|---|---|---|---|---|---|---|---|---|---|---|---|---|
| | | Temperature (°C.) | concentration (Vol %) | Ar | $NH_3$ (wt %) | $H_2$ | a | b | c | Temperature (°C.) | Time (hr) | Atmosphere | x | y | z |
| 7 | [(CH₃)₃Si]₂ | 1000 | 8.2 | 76.1 | 10.6 | 5.1 | 0.76 | 0.38 | 0.52 | 1300 | 2 | $N_2$ | 0.86 | 0.19 | 0.02 |
| 8 | [(CH₃)₃Si]₂CH₂ | 1000 | 9.8 | 28.3 | 51.2 | 10.7 | 0.20 | 1.09 | 0.46 | 1300 | 2 | $N_2$ | 0.30 | 0.88 | 0.04 |

EXAMPLES 9 TO 13

About 500 g/hour of [(CH₃)₃Si]₂NH was fed to a preheater by way of a feed pump to effect complete vaporization. To the preheater, were introduced nitrogen and gaseous ammonia in various proportions as shown in Table 2. The gases in the preheater were throughly intermixed and fed to an alumina reactor, 90 mm in internal diameter and 1,300 mm in length, which had been mounted in a vertical position and maintained at 1,000° C., thereby to allow the reaction to proceed.

About a 200-g portion of the resulting powder was heat treated at 1,350° C. for 4 hours under a nitrogen stream of a linear velocity of 12 cm/sec.

After the heat treatment, the resulting powder was amorphous, because no peak was detected in the X-ray diffraction pattern. Inspection of its SEM showed that the amorphous powder was composed of spherical particles and the particle size was distributed in a narrow range of from 0.1 to 0.5 μm. The composition of each composite powder was as shown in Table 2.

fed to an alumina reactor, 90 mm in diameter and 1,300 mm in length, which was held in a vertical resistance furnace and maintained at 1,000° C., thereby to allow the reaction to proceed. The resulting powder was filled in an alumina vessel and heat treated at 1,350° C. for 4 hours under an argon stream of a linear velocity of 12.0 mm/sec, thereby to yield a powder for forming a sintered product. The resulting powder was amorphous as confirmed by the X-ray diffraction pattern and the particles were spherical particles of 0.5 μm or below in size.

The above powder was mixed with 6% by weight of yttria (Y₂O₃) and 2% by weight of alumina (Al₂O₃) in an alumina mortar for 2 hours under a nitrogen stream. The resulting mixed powder was placed in a graphite die of 30 mm in diameter and sintered by hot-pressing at 1,800° C. for 2 hours under pressure of 350 kg/cm² in the presence of nitrogen.

The resulting sintered product was cut, then ground with a diamond grinder #100 and #600, and polished with diamond paste of 3 μm and 1 μm to obtain a test

TABLE 2

| Example No. | Composition of gas mixture before vapor phase reaction | | Composition of resulting powder $SiC_aN_bH_c$ | | | Composition of powder after heat treatment $SiC_xN_yO_z$ | | |
|---|---|---|---|---|---|---|---|---|
| | $N_2$ (Vol %) | $NH_3$ (Vol %) | a | b | c | x | y | z |
| 9 | 85 | 15 | 0.74 | 0.38 | 0.51 | 0.81 | 0.25 | 0.02 |
| 10 | 75 | 25 | 0.50 | 0.75 | 0.59 | 0.59 | 0.52 | 0.03 |
| 11 | 65 | 35 | 0.42 | 0.92 | 0.37 | 0.39 | 0.76 | 0.03 |
| 12 | 50 | 50 | 0.26 | 1.06 | 0.46 | 0.21 | 0.98 | 0.03 |
| 13 | 25 | 75 | 0.20 | 1.08 | 0.51 | 0.12 | 1.10 | 0.03 |

EXAMPLES 14 TO 18 AND COMPARATIVE EXAMPLES 1 AND 2

Figure 6:
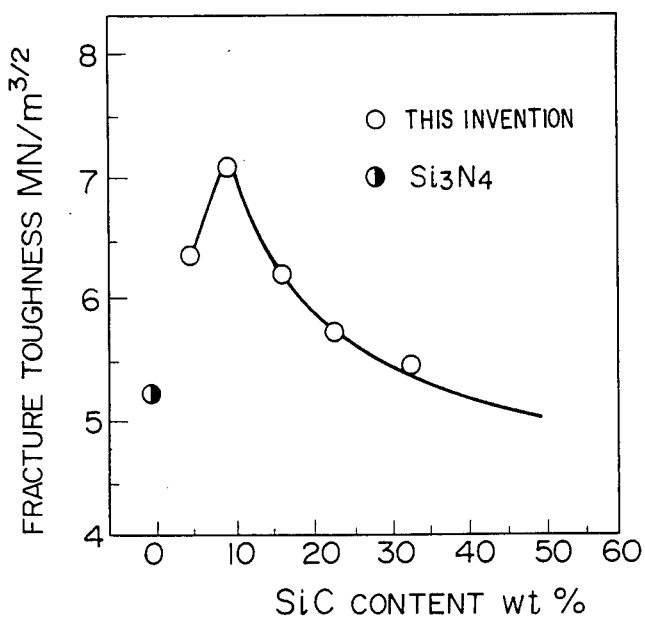
FIG. 6 shows the fracture toughness of the present sintered material.

About 500 g/hour of hexamethyldisilazane [Si(CH₃)₃]₂NH, used as starting material, was fed to a vaporizer to effect complete vaporization. The resulting vapor was thoroughly mixed with a gaseous ammonia-argon mixture of the composition shown in Table 3 and piece, 2×3×25 mm. The results of test for physical properties were as shown in Table 3. SEM and the optical micrograph of the section of fracture surface of the sintered product containing 10% by weight of silicon carbide prepared in Example 15 were as shown in FIG. 1 and FIG. 2, respectively. The 3-point flexural strength and the fracture toughness were as shown in FIG. 5 and FIG. 6, respectively.

TABLE 3

| | Example No. | | | | | Comparative Example No. | |
|---|---|---|---|---|---|---|---|
| | 14 | 15 | 16 | 17 | 18 | 1 | 2 |
| Composition of gaseous mixture before vapor phase reaction | | | | | | | |
| $NH_3$ (Vol %) | 85 | 75 | 50 | 46 | 35 | 90 | 25 |
| Ar (Vol %) | 15 | 25 | 50 | 54 | 65 | 10 | 75 |
| Heat treatment conditions | | | | | | | |
| Temperature (°C.) | 1350 | 1350 | 1350 | 1350 | 1350 | 1350 | 1350 |
| Time (hour) | 4 | 4 | 4 | 4 | 4 | 4 | 4 |
| Inert gas | Ar | Ar | Ar | Ar | Ar | Ar | Ar |
| Linear velocity (mm/sec) | 12 | 12 | 12 | 12 | 12 | 12 | 12 |
| Composition of resulting powder *1 | | | | | | | |
| C (% by weight) | 1.6 | 3.0 | 5.2 | 7.3 | 10.1 | 0.9 | 15.9 |
| N (% by weight) | 36.9 | 34.8 | 31.5 | 28.8 | 25.1 | 36.2 | 17.9 |
| O (% by weight) | 1.0 | 1.2 | 1.5 | 1.3 | 1.6 | 1.0 | 1.1 |
| SiC content *2 (% by weight) | 5 | 10 | 17 | 24 | 34 | 3 | 53 |

TABLE 3-continued

|  | Example No. | | | | | Comparative Example No. | |
| --- | --- | --- | --- | --- | --- | --- | --- |
|  | 14 | 15 | 16 | 17 | 18 | 1 | 2 |
| Physical properties of sintered product | | | | | | | |
| Density (g/cm$^3$) | 3.26 | 3.28 | 3.28 | 3.29 | 3.29 | 3.26 | 3.30 |
| Hardness (GPa) | 15.9 | 16.6 | 16.7 | 18.3 | 18.9 | 15.2 | 20.9 |
| Fracture toughness (MN/m$^{3/2}$) | 6.4 | 7.0 | 6.2 | 5.7 | 5.5 | 5.6 | 5.0 |
| 3-point flexural strength (kg/mm$^2$) | 98 | 104 | 100 | 103 | 100 | 85 | 101 |

Note:
*1 Other constituents: Si and metal impurities (Fe, Al, Ca etc.)
*2 Calculated on the assumption that all of the carbon in the starting material were converted into SiC

COMPARATIVE EXAMPLE 3

To a crystalline powder of commercial high-purity silicon nitride (α-phase, 90%; average particle size, 0.6 μm; impurities, Fe, Al, Ca<50 ppm; O:<1% by weight), were added 6% by weight of yttria (Y$_2$O$_3$) and 2% by weight of alumina (Al$_2$O$_3$). The resulting mixture together with ethanol was wet milled with silicon nitride balls for 5 hours and sintered by hot pressing under the same conditions as those in Example 14. The resulting sintered product was tested for physical properties. The results obtained were as follows:

| Density | 3.26 g/cm$^3$ |
| --- | --- |
| Vickers hardness | 14.5 GPa |
| Fracture toughness | 5.2 MN/m$^{3/2}$ |
| 3-Point flexural strength | 87 kg/mm$^2$ |

EXAMPLES 19 AND 20

A vapor phase reaction product was obtained in the same manner as in Example 14, except that ammonia-to-argon ratio (NH$_3$:Ar) was 75:25 and 50:50. The reaction product was heat-treated at 1,100° C. for 10 hours or at 1,200° C. for 7 hours both under a nitrogen atmosphere. Physical properties of the sintered product were found to be as shown in Table 4.

TABLE 4

| Example No. | Density (g/cm$^3$) | Hardness (GPa) | Fracture toughness (MN/m$^{3/2}$) | 3-Point flexural strength (kg/mm$^2$) |
| --- | --- | --- | --- | --- |
| 19 | 3.27 | 16.4 | 6.9 | 102 |
| 20 | 3.28 | 16.8 | 6.3 | 99 |

COMPARATIVE EXAMPLES 4 TO 7

Silicon nitride powder of Comparative Example 3 and β-silicon carbide (0.7 μm in average particle size; impurities contents: Fe, Al, Ca and O were 0.02, 0.1, 0.04 and 0.04% by weight, respectively) were mixed in proportions shown in Table 5. To each mixture, were added 6% by weight of yttria and 2% by weight of alumina. The resulting mixture and ethanol were wet mixed by milling with silicon nitride balls for 5 hours. The resulting mixture was sintered by hot pressing under the same conditions as in Example 14. Each sintered product was tested for physical properties. The results obtained were as shown in Table 5.

TABLE 5

|  | Comparative Example No. | | | |
| --- | --- | --- | --- | --- |
|  | 4 | 5 | 6 | 7 |
| SiC (wt %) | 5 | 10 | 20 | 30 |
| Si$_3$N$_4$ (wt %) | 95 | 90 | 80 | 70 |
| Fracture thoughness (MN/m$^{3/2}$) | 5.1 | 5.0 | 4.8 | 4.8 |

What is claimed is:

1. A sintered silicon nitride-silicon carbide composite material comprising substantially silicon nitride predominantly in β-phase and about 5 to 35% by weight of silicon carbide predominantly in β-phase, having a microstructure in which the silicon nitride is in the form of fine grains comprising elongated grains, 0.2 to 1.0 μm in length of minor axis and 1 to 10 μm in length of major axis, and equiaxed grains, 1 μm or below in average size, and the silicon carbide is in the form of equiaxed grains, 1 μm or below in average size, said silicon carbide grains being uniformly dispersed.

2. A sintered silicon nitride-silicon carbide composite material according to claim 1, wherein the sintered composite material has a three-point flexural strength of at least 95 kg/mm$^2$ at room temperature and a fracture toughness ($K_{IC}$) of at least 5.4 MN/m$^{3/2}$.

3. A process for producing the sintered silicon nitride-silicon carbide composite material of claim 1, which comprises the steps of:
   (1) heat-treating an amorphous composite powder having a composition represented by the general formula SiC$_a$N$_b$H$_c$, wherein 0.1<a<2.0, 0.1<b<1.5, and 0<c<4.0, at a temperature of 1,000° C. or higher but below 1,300° C. under an atmosphere of a non-oxidizing gas selected from nitrogen, argon, helium and hydrogen, or at a temperature from 1,300° to 1,400° C. under a stream of the linear velocity of at least 0.05 cm/sec. of a non-oxidizing gas selected from nitrogen, argon and helium, thereby to obtain an amorphous, spherical composite powder of the composition represented by the general formula SiC$_x$N$_y$O$_z$, wherein 0<x<1.5, 0<y<2.0 and 0<z<0.2 and having an average particle size of 1 μm or below;
   (2) mixing the resulting amorphous, spherical composite powder with 1 to 15% by weight of a sintering aid; and
   (3) sintering the resulting mixture in a non-oxidizing gas atmosphere under a pressure.

4. A process according to claim 3, wherein the sintering aid is at least one substance selected from magnesia (MgO), alumina (Al$_2$O$_3$), yttria (Y$_2$O$_3$), ceria (CeO$_2$) and lanthanum oxide (La$_2$O$_3$).

5. A process according to claim 3, wherein said amorphous spherical composite powder of the composition represented by the general formula SiC$_x$N$_y$O$_z$, wherein 0<x<1.5, 0<y<2.0 and 0<z<0.2, has a carbon content of 1.5 to 10.5% by weight and an oxygen content of 5% by weight or below.

6. A process according to claim 3 wherein said linear velocity is 0.05 to 100 cm/sec.

* * * * *